United States Patent
Andrieiev et al.

(10) Patent No.: US 11,776,340 B2
(45) Date of Patent: Oct. 3, 2023

(54) ELECTRONIC DEVICE AUTHENTICATION METHOD, AND APPARATUS ACCORDING THERETO

(71) Applicant: Samsung Electronics Co., Ltd., Suwon-si (KR)

(72) Inventors: Oleksandr Andrieiev, Suwon-si (KR); Jieun Keum, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 17/598,670

(22) PCT Filed: Mar. 26, 2020

(86) PCT No.: PCT/KR2020/004120
§ 371 (c)(1),
(2) Date: Sep. 27, 2021

(87) PCT Pub. No.: WO2020/197283
PCT Pub. Date: Oct. 1, 2020

(65) Prior Publication Data
US 2022/0198859 A1    Jun. 23, 2022

(30) Foreign Application Priority Data
Mar. 27, 2019 (KR) .................. 10-2019-0035179

(51) Int. Cl.
*G07C 9/22* (2020.01)
*G07C 9/27* (2020.01)
(Continued)

(52) U.S. Cl.
CPC ................ *G07C 9/22* (2020.01); *B60R 25/01* (2013.01); *B60R 25/24* (2013.01);
(Continued)

(58) Field of Classification Search
CPC .. G07C 9/22; G07C 9/00309; G07C 9/00904; G07C 9/27; B60R 25/01; B60R 25/24; H04L 9/0825; H04L 9/0869
See application file for complete search history.

(56) References Cited

U.S. PATENT DOCUMENTS 10,089,801 B1 * 10/2018 Musabeyoglu ....... G06F 21/335
11,042,816 B2     6/2021 Zaid et al.
(Continued)

FOREIGN PATENT DOCUMENTS

KR          10-0463643 B1   12/2004
KR     10-2017-0071094 A     6/2017
(Continued)

OTHER PUBLICATIONS

International Search Report dated Jul. 2, 2020 issued in International Application No. PCT/KR2020/004120.

*Primary Examiner* — Nabil H Syed
(74) *Attorney, Agent, or Firm* — Jefferson IP Law, LLP

(57) ABSTRACT

The disclosure relates to a method and apparatus for authenticating an electronic device. An operating method of a target device according to an embodiment includes generating a random value based on whether an electronic device is within a certain distance from the target device, transmitting, to the electronic device, first information including the generated random value and identification information of the target device, and receiving, from the electronic device, first authentication information obtained based on the first information, encrypting the received first authentication information and a target device key, transmitting the encrypted target device key and the encrypted first authentication information to a server, and receiving, from the server, second authentication information obtained based on the first authentication information, and determining whether to (Continued)

open or close a door based on a comparison between the second authentication information and the random value.

10 Claims, 9 Drawing Sheets

(51) Int. Cl.
    *B60R 25/01*     (2013.01)
    *B60R 25/24*     (2013.01)
    *G07C 9/00*     (2020.01)
    *H04L 9/08*     (2006.01)

(52) U.S. Cl.
    CPC ..... *G07C 9/00309* (2013.01); *G07C 9/00904* (2013.01); *G07C 9/27* (2020.01); *H04L 9/0825* (2013.01); *H04L 9/0869* (2013.01); *B60R 2325/10* (2013.01); *B60R 2325/205* (2013.01); *G07C 2009/00412* (2013.01); *G07C 2009/00769* (2013.01); *G07C 2209/63* (2013.01); *H04L 2209/84* (2013.01)

(56) References Cited

U.S. PATENT DOCUMENTS

| | | | | |
|---|---|---|---|---|
| 2011/0084799 | A1* | 4/2011 | Ficko | G07C 9/27 340/5.65 |
| 2016/0014131 | A1* | 1/2016 | Neafsey | H04W 12/082 713/171 |
| 2018/0356146 | A1 | 12/2018 | Moertl et al. | |
| 2020/0100108 | A1* | 3/2020 | Everson | H04L 9/3271 |
| 2021/0390811 | A1* | 12/2021 | Learmonth | H04L 63/0442 |

FOREIGN PATENT DOCUMENTS

| | | |
|---|---|---|
| KR | 10-1757214 B1 | 7/2017 |
| KR | 10-1866485 B1 | 6/2018 |
| KR | 10-2017-0100173 A | 7/2018 |

* cited by examiner

ELECTRONIC DEVICE AUTHENTICATION METHOD, AND APPARATUS ACCORDING THERETO

TECHNICAL FIELD

The disclosure relates to an electronic device authentication method and an apparatus therefor, and more particularly, to a method and apparatus for authenticating an electronic device by using a digitally signed random value.

BACKGROUND ART

As personalized electronic devices such as smart phones and tablet PCs have come into widespread use, technology for performing security, authentication, and the like using digitized virtual keys, that is, digital keys, has been developed. As digital key technology, technology in which a digital key is integrated into an electronic device, e.g., a smartphone, using wireless communication technology has been developed.

As a digital key is inserted into an electronic device, a user of the electronic device may open or close a door by using the digital key that replaces a physical key. Also, as the functionality of the digital key is further extended, the user of the electronic device may use the digital key to access and control a device.

The use of digital keys will bring great improvement in user convenience and industrial effects but security concerns have been raised. That is, a digital key basically needs to be integrated with an electronic device and thus is likely to be exposed to risks such as hacking of the electronic device. Accordingly, it is necessary to process a digital key in a high-security area.

DESCRIPTION OF EMBODIMENTS

Technical Problem

The disclosure provides an electronic device authentication method and an apparatus therefor.

Solution to Problem

An operating method of a target device according to an embodiment of the disclosure includes generating a random value based on whether an electronic device is within a certain distance from the target device, transmitting, to the electronic device, first information including the generated random value and identification information of the target device, and receiving, from the electronic device, first authentication information obtained based on the first information, encrypting the received first authentication information and a target device key, transmitting, to a server, the encrypted target device key and the encrypted first authentication information, and receiving, from the server, second authentication information obtained based on the first authentication information, and determining whether to open or close a door based on a comparison between the second authentication information and the random value.

An operating method of a server according to an embodiment of the disclosure includes receiving a public key for each of one or more electronic devices, receiving encrypted first authentication information, from a first device from among the one or more electronic devices, authenticating the first device based on the encrypted first authentication information, and transmitting, to a target device, second authentication information obtained based on the first authentication information.

An operating method of an electronic device according to an embodiment of the disclosure includes receiving, from a target device, first information including identification information of the target device and a random value, signing the received first information with a private key of the electronic device, and transmitting, to the target device, first authentication information including the signed first information and identification information of the electronic device, transmitting, to a server, a target device key received from the target device and the encrypted first authentication information, receiving, from the server, second authentication information obtained based on the first authentication information, and transmitting the received second authentication information to the target device.

A target device according to an embodiment of the disclosure includes a transceiver, a memory configured to store at least one instruction, and at least one processor configured to control the target device by executing the at least one instruction to generate a random value based on whether an electronic device is within a certain distance from the target device, transmit, to the electronic device, first information including the generated random value and identification information of the target device, and receive, from the electronic device, first authentication information obtained based on the first information, encrypt the received first authentication information and a target device key, transmit, to a server, the encrypted target device key and the encrypted first authentication information, and receive, from the server, second authentication information obtained based on the first authentication information, and determine whether to open or close a door based on a comparison between the second authentication information and the random value.

A server according to an embodiment of the disclosure includes a transceiver, a memory configured to store at least one instruction, and at least one processor configured to control the server by executing the at least one instruction to receive a public key for each of one or more electronic devices, receive encrypted first authentication information, from a first device from among the one or more electronic devices, authenticate the first device based on the encrypted first authentication information, and transmit second authentication information obtained based on the first authentication information to a target device.

An electronic device according to an embodiment of the disclosure includes a transceiver, a memory configured to store at least one instruction, and at least one processor configured to control the electronic device by executing the at least one instruction to receive, from a target device, first information including identification information of the target device and a random value, sign the received first information with a private key of the electronic device, and transmit, to the target device, first authentication information including the signed first information and identification information of the electronic device, transmit, to a server, a target device key received from the target device and the encrypted first authentication information, and receive, from the server, second authentication information obtained based on the first authentication information, and transmit the received second authentication information to the target device.

MODE OF DISCLOSURE

Figure 1:
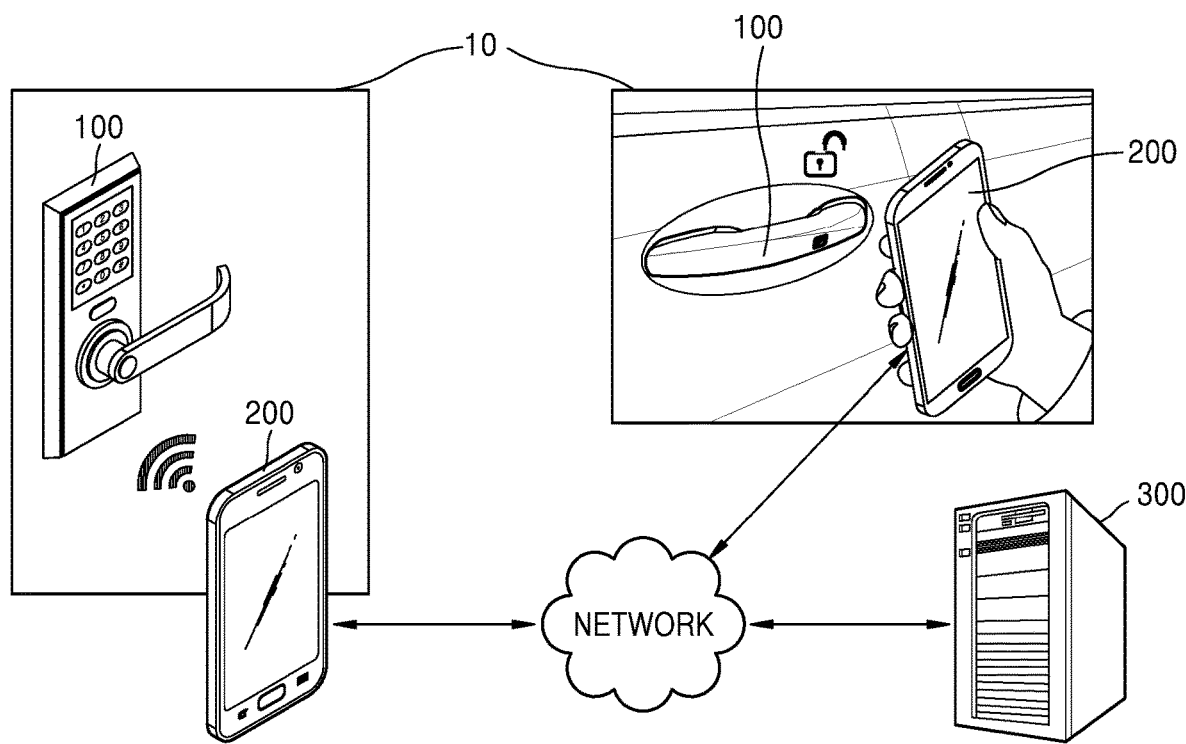
FIG. 1 is a view illustrating a system for authenticating an electronic device, according to an embodiment of the disclosure.

Hereinafter, embodiments of the disclosure will be described in detail with reference to the accompanying drawings so that the embodiments of the disclosure may be easily implemented by one of ordinary skill in the art. However, the disclosure may be embodied in many different forms and is not limited to the embodiments of the disclosure set forth herein. For clarity, parts not related to explaining the disclosure are omitted in the drawings and like components are denoted by like reference numerals throughout the specification.

Some embodiments of the disclosure may be represented by functional block configurations and various operations. Some or all of functional blocks may be implemented by various numbers of hardware and/or software configurations for performing certain functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented in an algorithm executed by one or more processors. Also, in the disclosure, the prior art may be employed for electronic configuration, signal processing, and/or data processing.

Also, lines or members connecting elements illustrated in the drawings are merely illustrative of functional connections and/or physical or circuit connections. In an actual device, the connections between components may be represented by various functional connections, physical connections, or circuit connections that are replaceable or added.

Hereinafter, the disclosure will be described in detail with reference to the accompanying drawings.

Throughout the specification, each of a target device key, a server key, and a public key and a private key of an electronic device is a unique key of each device assigned to each device, and may be used to encrypt or decrypt data.

FIG. 1 is a view illustrating a system for authenticating an electronic device, according to an embodiment of the disclosure.

Referring to FIG. 1, a system for authenticating an electronic device may include a target device 100, an electronic device 200, and a server 300.

The target device 100 may be an entity corresponding to a provided service. For example, the target device 100 may be provided in a gate of a vehicle, a hotel, a house, a building, or the like. In more detail, the target device 100 may be provided in a door 10 such as an access gate for starting and vehicle control as well as a vehicle door, a trunk gate, or a gas tank door of a vehicle to control whether to open or close the door 10. For example, the target device 100 may be a digital door lock for controlling whether to open or close the door 10. A type of the target device 100 for controlling whether to open or close the door by using a digital key is not limited to the example illustrated in FIG. 1.

The target device 100 may not be connected to a network. Accordingly, the target device 100 may transmit/receive data for authenticating the electronic device 200 to/from the server 300 through the electronic device 200 connected to the network. The target device 100 may perform short-range wireless communication with the electronic device 200. In detail, examples of the short-range communication according to an embodiment of the disclosure may include, but are not limited to, wireless local area network (LAN), Wi-Fi, Bluetooth, Zigbee, Wi-Fi direct (WFD), ultra-wideband (UWB), infrared data association (IrDA), Bluetooth low energy (BLE), and near-field communication (NFC).

The electronic device 200 according to an embodiment of the disclosure may be implemented as any of various devices. Examples of the electronic device 200 may include a smart TV, a set-top box, a mobile phone, a tablet PC, a digital camera, a laptop computer, a desktop computer, an electronic book terminal, a digital broadcasting terminal, a personal digital assistant (PDA), a portable multimedia player (PMP), a navigation device, an MP3 player, a wearable device, and the like. However, the electronic device 200 is not limited to the above examples, and may be any device as long as the device may communicate with the server 300 through the network and may communicate with the target device 100 through short-range wireless communication. For example, the electronic device 200 may be any device as long as the device may transmit/receive data for authenticating the electronic device 200 to/from the server 300 through the network.

A communication method of the network according to an embodiment of the disclosure is not limited, and may include a communication method using a communication network (e.g., a mobile communication network, wired Internet, wireless Internet, or broadcasting network) which may be included in the network. For example, the network may include at least one of a personal area network (PAN), a local area network (LAN), a campus area network (CAN), a metropolitan area network (MAN), a wide area network (WAN), a broadband network (BBN), and the Internet. The network may have at least one of, but not limited to, a bus network topology, a star network topology, a ring network topology, a mesh network topology, a star-bus network topology, and a tree or hierarchical network topology.

The server 300 may communicate with the electronic device 200 through the network, and may be implemented as at least one computer device. The server 300 may be distributed as a cloud, and may provide commands, code, files, data, etc.

The server 300 according to an embodiment of the disclosure may transmit/receive data required to authenticate the electronic device 200 to/from the target device 100 through the electronic device 200. For example, the server 300 may authenticate the electronic device 200, and may apply authentication information to the target device 100 through the electronic device 200.

Figure 2:
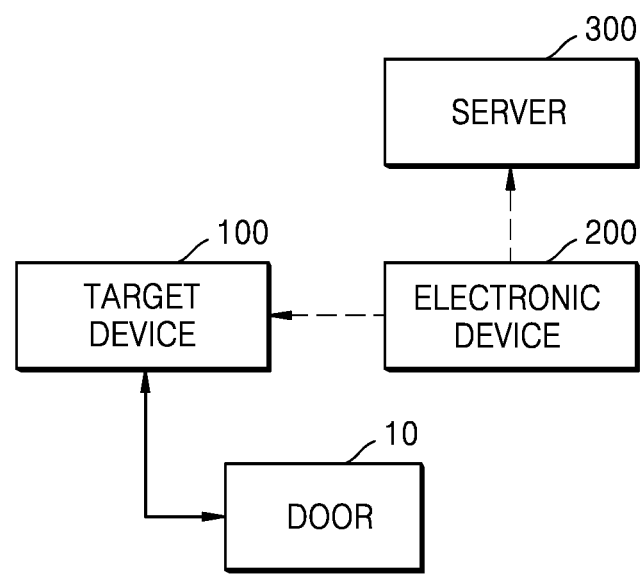
FIG. 2 is a block diagram illustrating a connection between devices for authenticating an electronic device, according to an embodiment of the disclosure.

FIG. 2 is a block diagram illustrating a connection between devices for authenticating an electronic device, according to an embodiment of the disclosure.

When elements of FIG. 2 are directly connected to one another, the connection is marked by a solid line; and when elements of FIG. 2 are connected to one another through communication, the connection is marked by a dashed line. For example, the target device 100 may be directly attached to or provided in the door 10. However, the disclosure is not limited thereto, and the target device 100 may be connected to the door 10 through communication. Also, the target device 100 may be connected to the electronic device 200 through short-range communication, and the electronic device 200 may be connected to the server 300 through a network. In this case, because the target device 100 is capable of only short-range communication, the target device 100 may not directly communicate with the server 300.

For convenience of explanation, the target device 100 is, for example, a digital door lock, and the electronic device 200 is, for example, a user terminal.

When the user terminal is within a certain distance, the digital door lock according to an embodiment of the disclosure may generate a random value for security, and may transmit the generated random value to the user terminal through short-range communication (e.g., UWB). In this case, the electronic device 200, that is, the user terminal, may sign the random value received from the digital door lock by using a private key of the user terminal. The server 300 may authenticate whether the user terminal is a terminal authorized to open or close the door 10 based on the signed random value. Also, the server 300 may transmit authentication information to the digital door lock through the user terminal. In this case, the digital door lock may control whether to open or close the door 10 based on a comparison between the received authentication information and the random value.

Operating methods of the target device 100, the electronic device 200, and the server 300 will now be described in detail with reference to FIGS. 3 through 9.

Figure 3:
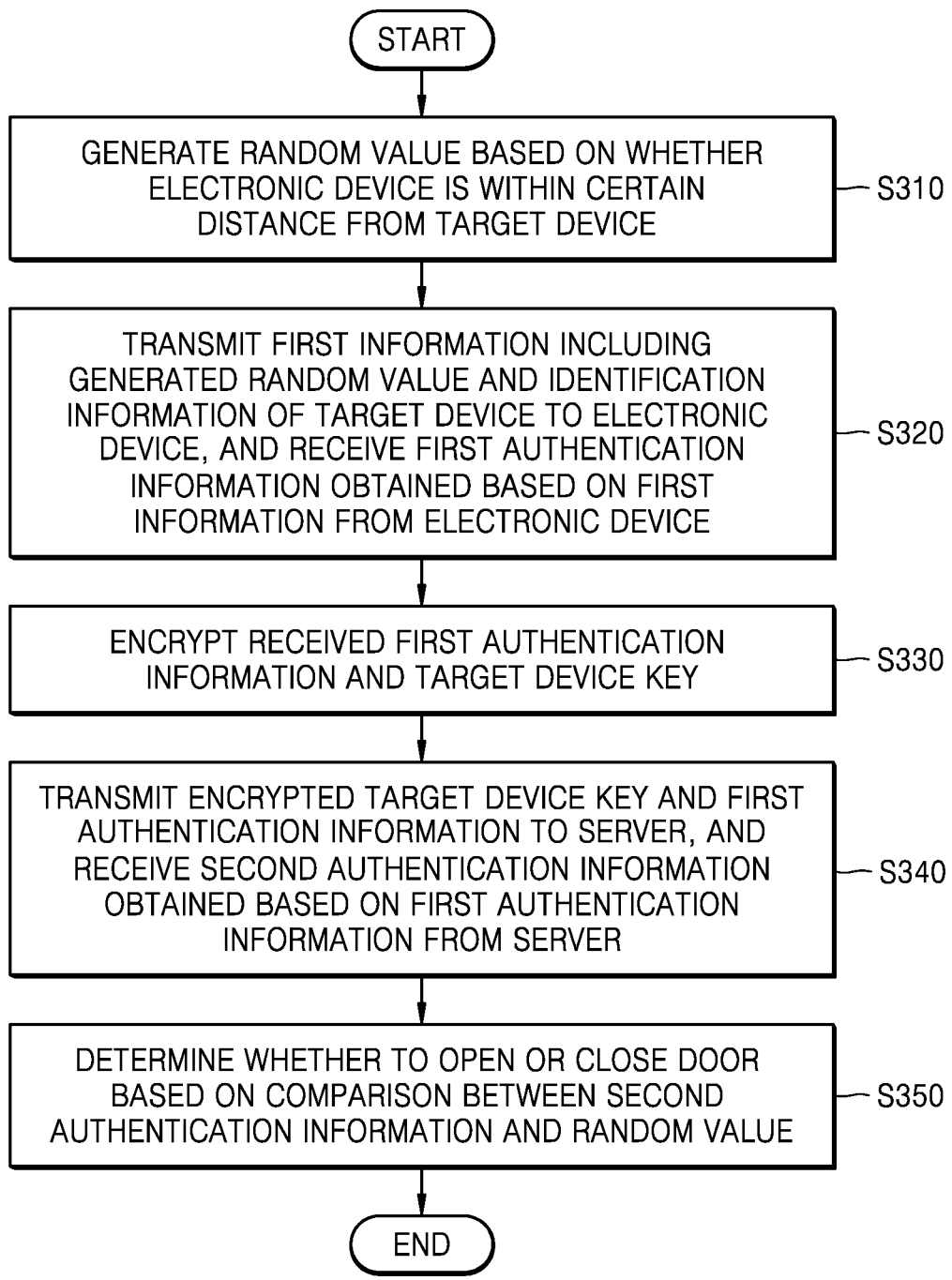
FIG. 3 is a flowchart illustrating an operating method of a target device, according to an embodiment of the disclosure.

FIG. 3 is a flowchart illustrating an operating method of a target device, according to an embodiment of the disclosure.

In operation S310, the target device 100 may generate a random value based on whether the electronic device 200 is within a certain distance from the target device 100. In detail, when it is detected that the electronic device 200 is within a short-range communication distance, the target device 100 may generate a random value. In this case, the random value may be a nonce.

Also, the random value may be stored in the target device 100, and may be used once to authenticate the electronic device 200. That is, the target device 100 may prevent a replay attack by generating a new random value whenever the electronic device 200 is authenticated. For example, when a certain time elapses after a first random value is generated, the target device 100 may generate a second random value. In this case, even when authentication information received after the second random value is generated corresponds to the first random value, the target device 100 may determine that the electronic device 200 is not authenticated.

In operation S320, the target device 100 may transmit first information including the generated random value and identification information of the target device 100 to the electronic device 200, and may receive first authentication information obtained based on the first information from the electronic device 200. The identification information of the target device 100 may be, but is not limited to, a unique ID of the target device 100. Also, the target device 100 may transmit the first information to the electronic device 200 by using short-range communication.

The first authentication information may include the first information that is signed with a private key of the electronic device 200 and identification information of the electronic device 200. In this case, the identification information of the electronic device 200 may be a unique ID of the electronic device 200.

In operation S330, the target device 100 may encrypt the received first authentication information and a target device key. In detail, the target device 100 may generate the target device key or may receive the target device key from an external device (not shown) in order to encrypt the received first authentication information by using the target device key. For example, the target device 100 may receive or install the target device key through a certain storage medium (e.g., a universal serial bus (USB)). Also, the target device 100 may previously receive a server key for encrypting the target device key from the server 300 and may store the server key.

As the target device key is encrypted by using the server key, the server having the server key may decrypt the received authentication information, thereby preventing spoofing. The term 'spoofing' refers to an attack that accesses a system as if a user is an authorized user or bypasses access by pretending to be an authorized address on a network. Accordingly, the target device key encrypted by using the server key may be decrypted only by the server 300, thereby preventing spoofing. Although the target device key and the server key are described in operation S330 for convenience of explanation, the target device key and the server key may be previously generated or received, may be stored in the target device 100, and may be used in operation S330.

The target device 100 may encrypt the first authentication information by using the target device key. Also, the target device 100 may encrypt the target device key by using the server key.

In operation S340, the target device 100 may transmit the encrypted target device key and the encrypted first authentication information to the server 300, and may receive second authentication information obtained based on the first authentication information from the server 300. In detail, the target device 100 may transmit the encrypted target device key and the encrypted first authentication information to the server 300 through the electronic device 200. Also, when the first authentication information is authenticated by the server 300, the target device 100 may receive the second authentication information obtained based on at least part of the first authentication information.

In operation S350, the target device 100 may determine whether to open or close a door based on a comparison between the second authentication information and the random value. In detail, when the first authentication information transmitted from the target device 100 is transmitted to the server 300 through the electronic device 200, the first authentication information may include the random value generated by the target device 100. In this case, the second authentication information obtained based on at least part of the first authentication information may include the random value generated by the target device 100. Also, the second authentication information may be encrypted by using the target device key and may be transmitted to the target device 100 through the electronic device 200.

The target device 100 may decrypt the received second authentication information by using the target device key. Also, when the decrypted second authentication information includes a value corresponding to the random value generated by the target device 100, the target device 100 may determine to open the door. When the decrypted second authentication information does not include a value corresponding to the random value generated by the target device 100, the target device 100 may determine to close the door.

When the first authentication information transmitted from the target device 100 is transmitted to the server 300 through the external device (not shown) other than the electronic device 200, or when authentication information generated from the external device (not shown) is transmitted to the server 300, the server 300 may not receive the random value generated by the target device 100.

In this case, even when the target device 100 decrypts certain authentication information received from the server 300, because a value corresponding to the random value generated by the target device 100 is not included in the certain authentication information, the target device 100 may determine to close the door.

Figure 4:
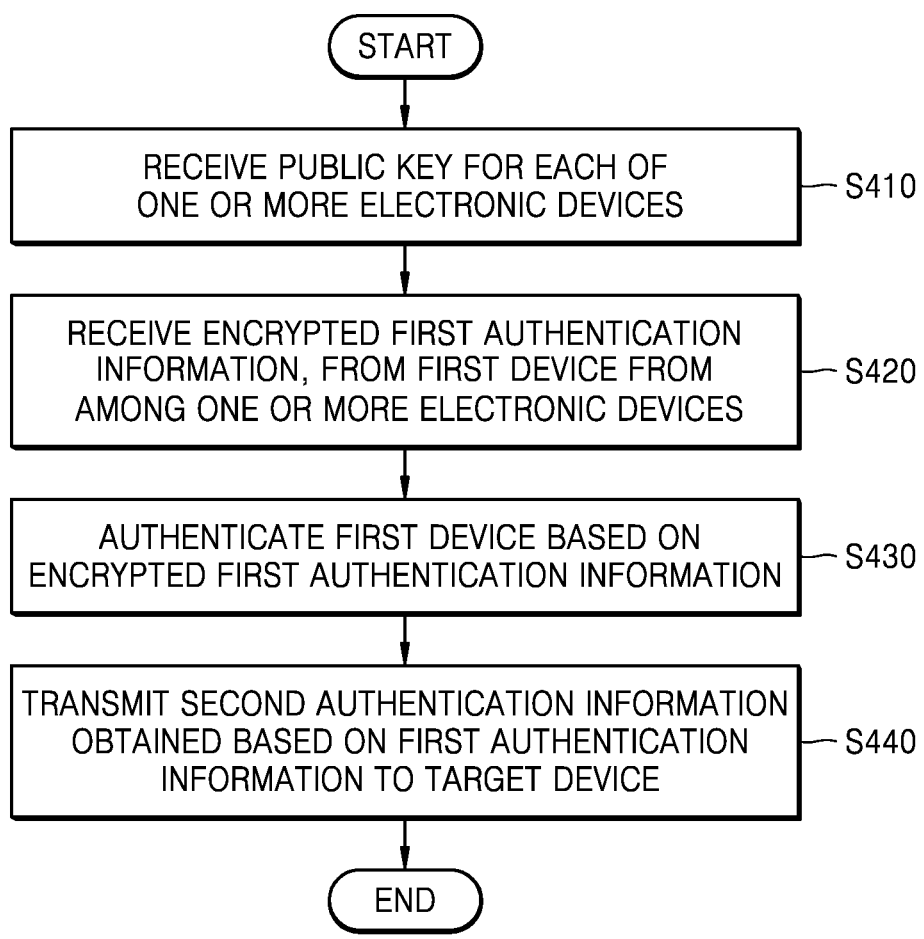
FIG. 4 is a flowchart illustrating an operating method of a server, according to an embodiment of the disclosure.

FIG. 4 is a flowchart illustrating an operating method of a server, according to an embodiment of the disclosure.

In operation S410, the server 300 may receive a public key for each of one or more electronic devices 200. The server 300 may store mapping information in which the received public key corresponds to each of the one or more electronic devices 200.

In operation S420, the server 300 may receive encrypted first authentication information, from a first device from among the one or more electronic devices 200.

In operation S430, the server 300 may authenticate the first device based on the encrypted first authentication information. In detail, the server 300 may receive a target device key along with the encrypted first information. In this case, the target device key may be encrypted by using a server key for security. Accordingly, the server 300 may decrypt the received target device key by using the server key, and may decrypt the received first authentication information by using the decrypted target device key.

In this case, the decrypted first authentication information may include a random value encrypted by using a private key of the first device. The server 300 may decrypt a random value encrypted by using a public key of the first device.

When the server 300 receives the first authentication information signed with a private key of an external device (not shown) other than the first device, the server 300 does not have a public key of the external device and thus may not be able to decrypt the received first authentication information. That is, in this case, the external device transmitting the first authentication information may not be authenticated.

In operation S440, the server 300 may transmit second authentication information obtained based on the first authentication information to the target device. The first authentication information may include a random value generated by the target device 100, identification information of the target device, and identification information of the first device. Accordingly, the server 300 may include the random value generated by the target device 100 in the second authentication information, based on at least part of the first authentication information.

Accordingly, the server 300 may transmit the second authentication information to the target device 100 to authenticate the first authentication information. In detail, when the random value generated by the target device 100 corresponds to the random value included in the second authentication information, it may be authenticated that the first authentication information is received from the target device 100.

Figure 5:
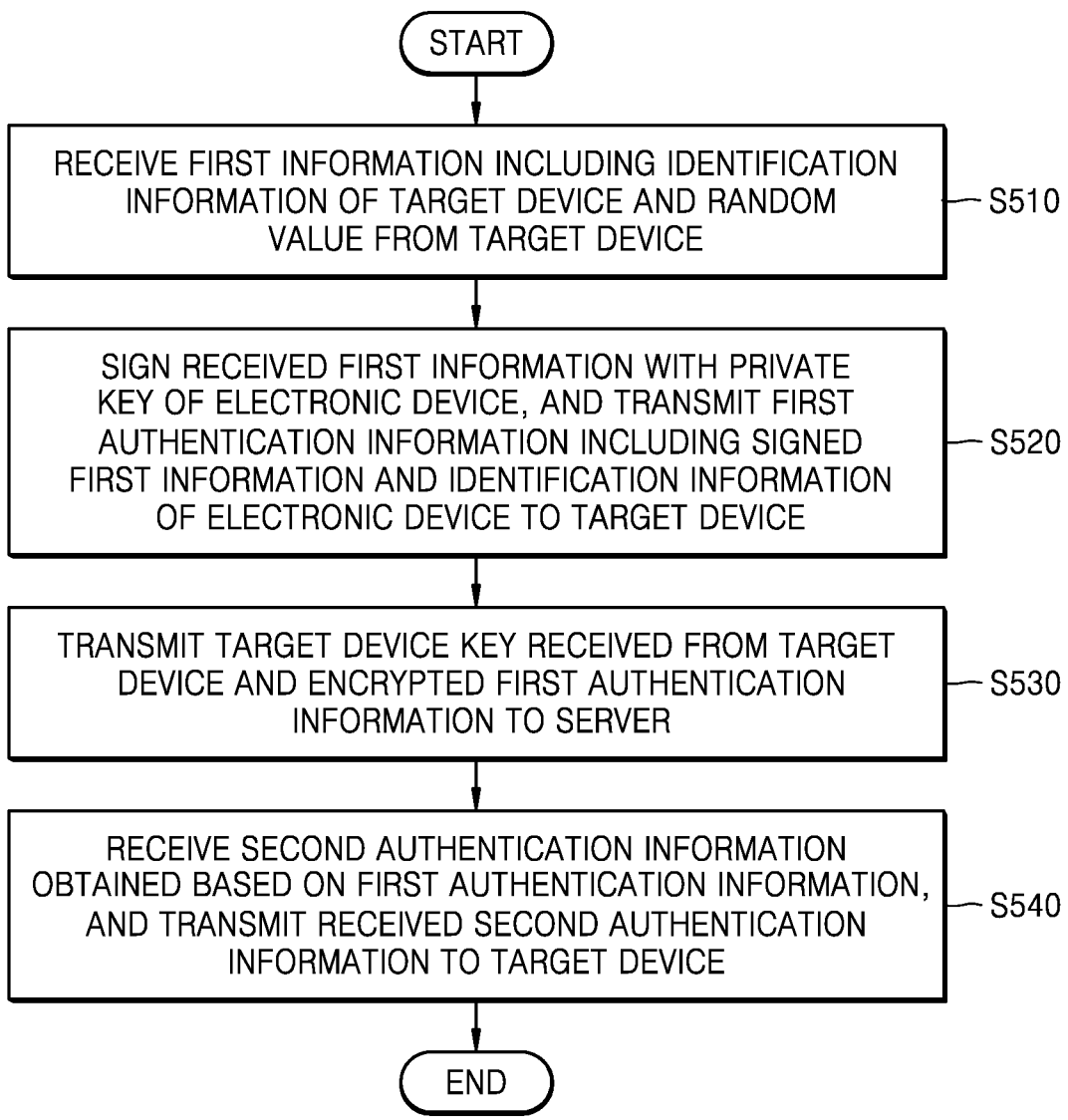
FIG. 5 is a flowchart illustrating an operating method of an electronic device, according to an embodiment of the disclosure.

FIG. 5 is a flowchart illustrating an operating method of an electronic device, according to an embodiment of the disclosure.

In operation S510, the electronic device 200 may receive first information including identification information of the target device 100 and a random value from the target device 200.

In operation S520, the electronic device 200 may sign the received first information with a private key of the electronic device 200, and may transmit first authentication information including the signed first information and identification information of the electronic device 200 to the target device 100. In detail, the electronic device 200 may sign the received first information with the private key of the electronic device 200, to be decrypted by the server 300 having a public key of the electronic device 200. Also, the electronic device 200 may generate the first authentication information including the signed first information and the identification information (e.g., ID) of the electronic device 200, and may transmit the generated first authentication information to the target device 100.

In operation S530, the electronic device 200 may transmit a target device key received from the target device 100 and the encrypted first authentication information to the server 300. In this case, the electronic device 200 may further receive server information along with the target device key and the encrypted first authentication information from the target device 100. The electronic device 200 may transmit certain information received from the target device 100 to the server 300. Accordingly, the target device 100 may support the certain information received from the target device 100 to be transmitted to the server 300, by also transmitting server information of the electronic device 200. The server information may be a uniform resource identifier (URI) indicating an address of the server.

As described above, the encrypted first authentication information may be encrypted by using the target device key, and the target device key may be encrypted by using a server key.

In operation S540, the electronic device 200 may receive second authentication information obtained based on the first authentication information from the server 300, and may transmit the received second authentication information to the target device 100. In detail, the electronic device 200 may receive the second authentication information from the server 300 through a network, and may transmit the received second authentication information to the target device 100 through short-range communication.

Figure 6:
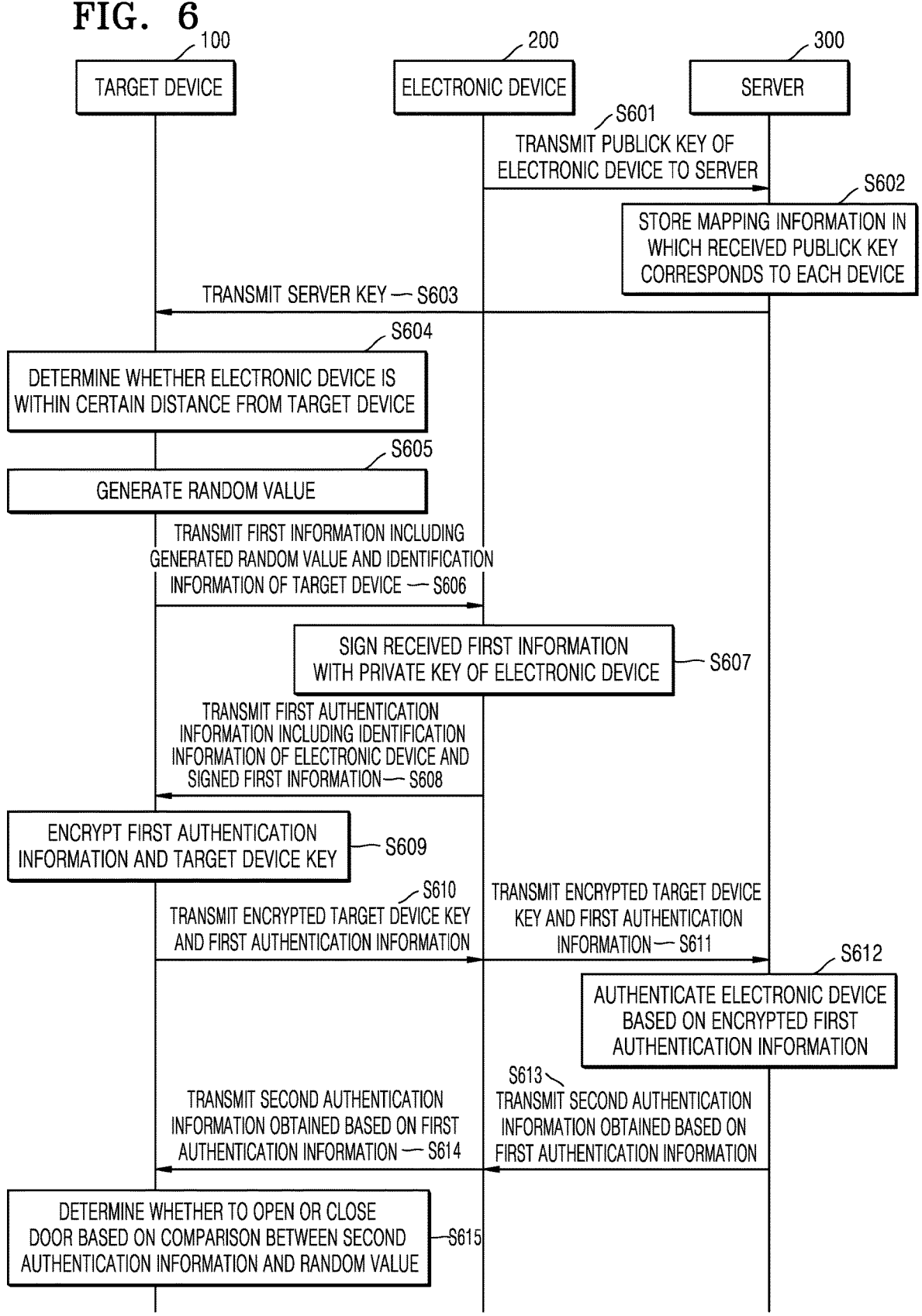
FIG. 6 is a flowchart illustrating a method of transmitting/receiving data between devices, according to an embodiment of the disclosure.

FIG. 6 is a flowchart illustrating a method of transmitting/receiving data between devices, according to an embodiment of the disclosure.

The electronic device 200 may transmit a public key of the electronic device 200 to the server 300 (S601). The server 300 may store mapping information in which the received public key corresponds to each electronic device 200 (S602). That is, the server 300 may generate and store the mapping information in which the public key corresponds to identification information of the electronic device 200.

Also, the server 300 may transmit a server key to the target device 100 (S603). The target device 100 may generate a target device key, or may receive a target device key from an external device (not shown).

The target device 100 may determine whether the electronic device 200 is within a certain distance from the target device 100 (S604). For example, the target device 100 may determine whether the electronic device 200 is within a certain distance by using short-range communication such as UWB or NFC. Also, when the electronic device 200 is within the certain distance, the target device 100 may generate a random value (S605).

The target device 100 may transmit first information including the generated random value and identification information of the target device 100 to the electronic device 200 (S606). The electronic device 200 may sign the received first information with a private key of the electronic device 200 (S607). Also, the electronic device 200 may transmit first authentication information including the signed first information and the identification information of the electronic device 200 to the target device 100 (S608).

The target device 100 may encrypt the received first authentication information and the target device key (S609). In detail, the target device 100 may encrypt the first authentication information by using the target device key, and may encrypt the target device key by using the server key.

The target device 100 may transmit the encrypted target device key and the encrypted first authentication information to the server 300 through the electronic device 200. Accordingly, even when the target device 100 is not connected to a network, the target device 100 may transmit/receive certain data to/from the server 300 by using the electronic device 200 connected to the network. In detail, the target device 100 may transmit the encrypted target device key and the encrypted first authentication information to the electronic device 200 (S610). The electronic device 200 may transmit the encrypted target device key and the encrypted first authentication information received from the target device 100 to the server 300 through the network (S611).

The server 300 may authenticate the electronic device based on the encrypted first authentication information (S612). In detail, the server 300 may decrypt the target device key by using the server key, and may decrypt the received first authentication information by using the decrypted target device key and the public key of the electronic device 200.

The server 300 may authenticate whether the electronic device 200 is an authorized device based on the decrypted first authentication information. For example, the server 300 may identify the identification information of the electronic device 200 included in the first authentication information based on the mapping information.

The server 300 may transmit second authentication information obtained based on the first authentication information to the target device 100 through the electronic device 200 (S613 and S614). In detail, the server 300 may generate the second authentication information based on at least part of the first authentication information. When the first authentication information is received from the target device 100, the second authentication information may include a value corresponding to the random value generated by the target device 100.

The target device 100 may determine whether to open or close a door based on a comparison between the received second authentication information and the random value (S615). In detail, the target device 100 may determine to open the door when the random value is included in the second authentication information. Also, the target device 100 may determine to close the door when the value corresponding to the random value is not included in the second authentication information. For example, when the first authentication information is received from an external device (not shown) due to a spoofing attack, the random value generated by the target device 100 is not included in the first authentication information, and thus the second authentication information may not include the random value generated by the target device 100. In this case, as a result of a comparison between the second authentication information and the random value, because the value corresponding to the random value is not included in the second authentication information, the target device 100 may determine not to open the door.

Figure 7:
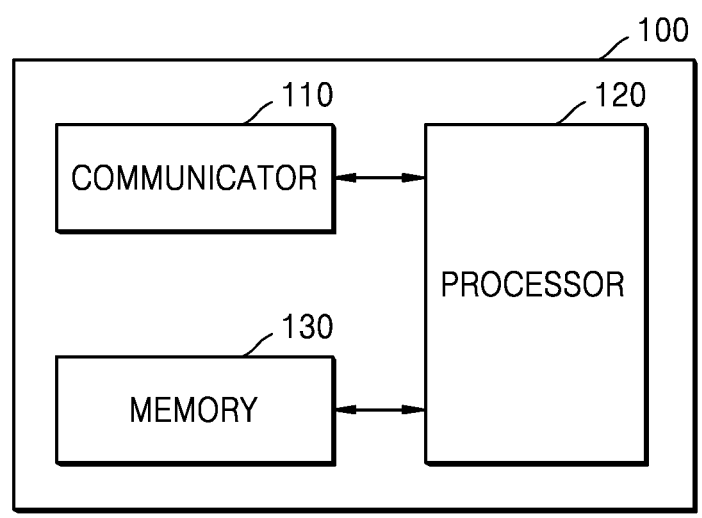
FIG. 7 is a block diagram illustrating an internal configuration of a target device, according to an embodiment of the disclosure.

FIG. 7 is a block diagram illustrating an internal configuration of a target device, according to an embodiment of the disclosure.

Referring to FIG. 7, the target device 100 may include a communicator 110, a processor 120, and a memory 130. However, the disclosure is not limited thereto, and the target device 100 may include more or fewer elements than those illustrated in FIG. 7.

Although the target device 100 includes one processor in FIG. 7, an embodiment is not limited thereto and the target device 100 may include a plurality of processors. At least some of operations and functions of the processor 120 described below may be performed by the plurality of processors. The target device 100 of FIG. 7 may perform a method of authenticating an electronic device by using a digitally signed random value, according to various embodiments of the disclosure, and the description of FIGS. 1 through 6 may be applied. Accordingly, the same description as that made above will be omitted.

The communicator 110 may perform short-range communication with the electronic device 200. To this end, the communicator 110 may include a communication module for short-range communication. For example, the communicator 110 may include a communication module for performing any of various short-range communications such as infrared communication and magnetic secure transmission (MST), as well as Wi-Fi, Wi-Fi Direct, UWB, Bluetooth, and NFC. The communication module may be in the form of a chipset, or may be a sticker/barcode (e.g., a sticker with an NFC tag) storing information necessary for communication.

According to an embodiment of the disclosure, the memory 130 may install and store various types of data such as files and programs such as applications. The processor 120 may access and use data stored in the memory 130, or may store new data in the memory 130. In an embodiment of the disclosure, a target device key may be registered in the memory 130, and programs and data for generating a random value may be installed and stored in the memory 130.

The processor 120 may control an overall operation of the target device 100, and may include at least one processor such as a central processing unit (CPU) or a graphics processing unit (GPU). The processor 120 may control other elements included in the target device 100 to perform an operation for authenticating the electronic device 200. The processor 120 may control other elements included in the target device 100 to perform an operation of generating a random value, comparing the random value with received authentication information, and authenticating the electronic device 200.

The processor 120 may execute programs stored in the memory 130 or an external device (not shown), may read stored files, or may store new files.

According to an embodiment, the processor 120 may generate a random value based on whether the electronic device 200 is within a certain distance from the target device 100, may transmit first information including the generated random value and identification information of the target device 100 to the electronic device 200, may receive first authentication information obtained based on the first information from the electronic device 200, may encrypt the received first authentication information and a target device key, may transmit the encrypted target device key and the encrypted first authentication information to the server 300, may receive second authentication information obtained based on the first authentication information from the server 300, and may determine whether to open or close a door based on a comparison between the second authentication information and the random value.

Also, the processor 120 may transmit the encrypted target device key and the encrypted first authentication information to the server 300 through the electronic device 200, and may receive the second authentication information from the server through the electronic device 200.

The processor 120 may receive a server key from the server 300, and may encrypt the target device key by using the server key.

Also, the processor 120 may decrypt the second authentication information by using the target device key. When the decrypted second authentication information includes a value corresponding to the random value, the processor 120 may determine to open the door; and when the decrypted second authentication information does not include the value corresponding to the random value, the processor 120 may determine to close the door.

Figure 8:
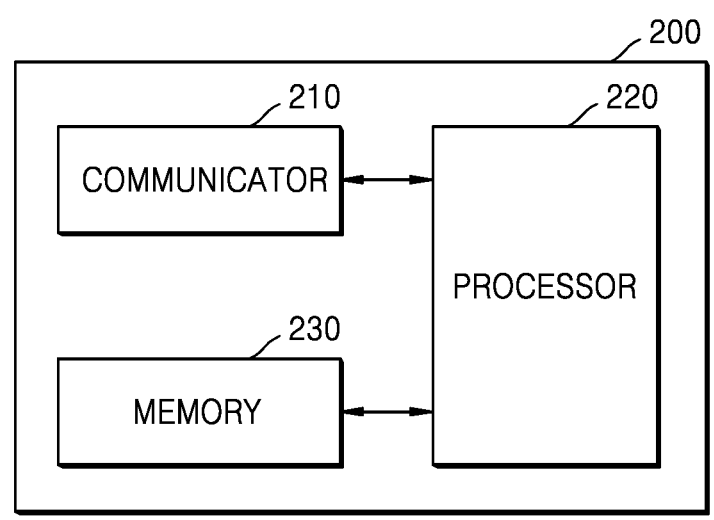
FIG. 8 is a block diagram illustrating an internal configuration of an electronic device, according to an embodiment of the disclosure.

FIG. 8 is a block diagram illustrating an internal configuration of an electronic device, according to an embodiment of the disclosure.

Referring to FIG. 8, the electronic device 200 may include a communicator 210, a processor 220, and a memory 230. However, the disclosure is not limited thereto, and the electronic device 200 may include more or fewer elements than those illustrated in FIG. 8.

Although the electronic device 200 includes one processor in FIG. 8, an embodiment is not limited thereto and the electronic device 200 may include a plurality of processors. At least some of operations and functions of the processor 220 described below may be performed by the plurality of processors. The electronic device 200 of FIG. 8 may perform a method for authenticating the electronic device 200 by using a digitally signed random value, according to various embodiments of the disclosure, and the description of FIGS. 1 through 6 may be applied. Accordingly, the same description as that made above will be omitted.

The communicator 210 may perform wired/wireless communication with the server 300 through a network, and may perform short-range communication with the target device 100. To this end, the communicator 210 may include a communication module supporting at least one of various wired/wireless communication methods. For example, the communication module may be in the form of a chipset, or may be a sticker/barcode (e.g., a sticker with an NFC tag) storing information necessary for communication.

The wireless communication may include, for example, at least one of cellular communication, wireless fidelity (Wi-Fi), Wi-Fi Direct, Bluetooth, ultra-wideband (UWB), and near-field communication (NFC). The wired communication may include, for example, at least one of universal serial bus (USB) and high-definition multimedia interface (HDMI).

In an embodiment, the communicator 210 may include a communication module for short-range communication. For example, the communicator 210 may include a communication module for performing any of various short-range communications such as infrared communication and magnetic secure transmission (MST), as well as Wi-Fi, Wi-Fi Direct, Bluetooth, and NFC described above.

Various types of data such as files and programs such as applications may be installed and stored in the memory 230. The processor 220 may access and use data stored in the memory 230, or may store new data in the memory 230. In an embodiment, programs and data for authenticating the electronic device 200 by using a digitally signed random value may be installed and stored in the memory 230.

The processor 220 may control an overall operation of the electronic device 200, and may include at least one processor such as a CPU or a GPU. The processor 220 may control other elements included in the electronic device 200 to perform an operation of signing a random value. The processor 220 may control other elements included in the electronic device 200 to perform an operation for authenticating the electronic device 200 by using a digitally signed random value.

The processor 220 may execute programs stored in the memory 230, may read stored files, or may store new files.

According to an embodiment, the processor 220 may sign a random value of information received from the target device 100 by using a private key of the electronic device 200, and may transmit the signed random value and identification information of the electronic device 200 to the target device 100. Also, the processor 220 may control each element to support data transmission/reception between the target device 100 and the server 300.

According to an embodiment, the processor 220 may receive first information including identification information of the target device 100 and a random value from the target device 100, may sign the received first information with a private key of the electronic device 200, may transmit first authentication information including the signed first information and identification information of the electronic device 200 to the target device 100, may transmit a target device key received from the target device 100 and the encrypted first authentication information to the server 300, may receive second authentication information obtained based on the first authentication information from the server 300, and may transmit the received second authentication information to the target device 100. In this case, the encrypted first authentication information may be encrypted by using the target device key, and the target device key may be encrypted by using a server key.

Also, the processor 220 may receive server information from the target device 100, and may transmit the target device key and the first authentication information received from the target device 100 to the server 300 based on the received server information.

Also, the processor 220 may transmit a public key of the device for authenticating information about the electronic device 200 to the server 300.

Figure 9:
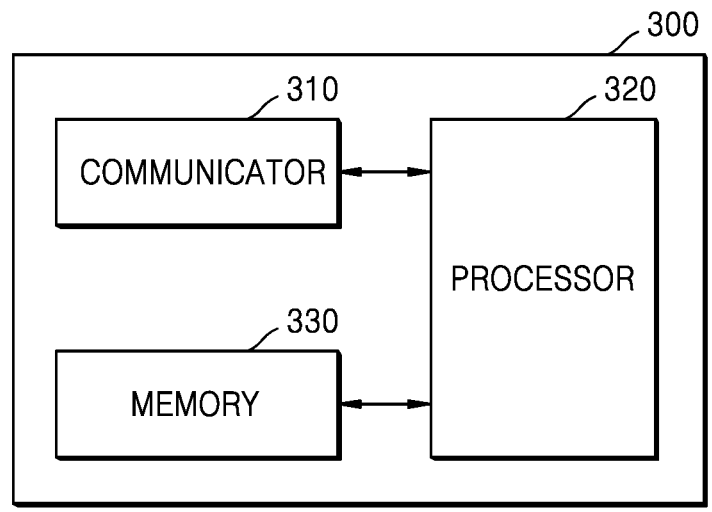
FIG. 9 is a block diagram illustrating an internal configuration of a server, according to an embodiment of the disclosure.

FIG. 9 is a block diagram illustrating an internal configuration of a server, according to an embodiment of the disclosure.

Referring to FIG. 9, the server 300 may include a communicator 310, a processor 320, and a memory 330. However, the disclosure is not limited thereto, and the server 300 may include more or fewer elements than those illustrated in FIG. 9.

Although the server 300 includes one processor in FIG. 9, an embodiment is not limited thereto and the server 300 may include a plurality of processors. At least some of operations and functions of the processor 330 described below may be performed by the plurality of processors. The server 300 of FIG. 9 may perform a method for authenticating an electronic device by using a digitally signed random value, according to various embodiments, and the description of FIGS. 1 through 6 may be applied. Accordingly, the same description as that made above will be omitted.

The communicator 310 may perform wired/wireless communication with the electronic device 200 through a network. To this end, the communicator 310 may include a communication module supporting at least one of various wireless communication methods. For example, the communication module may be in the form of a chipset, or may be a sticker/barcode (e.g., a sticker with an NFC tag) storing information necessary for communication.

The wireless communication may include, for example, at least one of cellular communication, wireless fidelity (Wi-Fi), Wi-Fi Direct, Bluetooth, ultra-wideband (UWB), and near-field communication (NFC). The wired communication may include, for example, at least one of USB and high-definition multimedia interface (HDMI).

Various types of data such as files and programs such as applications may be installed and stored in the memory 330. The processor 320 may access and use data stored in the memory 330, or may store new data in the memory 330. In an embodiment, programs and data for authenticating the electronic device 200 may be installed and stored in the memory 330.

The processor 320 may control an overall operation of the server 300, and may include at least one processor such as a CPU or a GPU. The processor 320 may control other elements included in the server 300 to perform an operation for authenticating the electronic device 200. The processor 320 may control other elements included in the server 300 to perform an operation for authenticating the electronic device 200.

The processor 320 may execute programs stored in the memory 330, may read stored files, or may store new files.

According to an embodiment, the processor 320 may control each element to receive first authentication information from the electronic device 200, verify the electronic device 200 by using the first authentication information, and transmit second authentication information to the electronic device 200 based on the first authentication information.

According to an embodiment, the processor 320 may receive a public key for each of one or more electronic devices 200, may receive encrypted first authentication information from a first device from among the one or more electronic devices 200, may authenticate the first device based on the encrypted first authentication information, and may transmit second authentication information obtained based on the first authentication information to the target device 100.

Also, the processor 320 may store mapping information in which the received public key corresponds to each of the one or more devices. Also, the processor 320 may transmit the second authentication information to the target device 100 through the first device.

Also, the processor 320 may receive a target device key from the target device 100, may transmit a server key to the target device 100, may decrypt the received target device key by using the server key when the received target device key is encrypted by using the server key, and may decrypt the first authentication information by using a public key of the first device and the decrypted target device key.

The afore-described embodiments may be implemented as a computer-executable program, and may be executed by a general-purpose digital computer that runs the program by using a computer-readable recording medium. Also, a structure of data used in the embodiments may be recorded by using various units on a computer-readable medium. Also, the embodiments may be implemented as a computer program product including a recording medium including instructions that may be executed in computers, e.g., a program module executed in computers. For example, methods may be implemented as software modules or algorithms, and may be stored as program commands or computer-readable code executable on a computer-readable recording medium.

A computer-readable medium may be an arbitrary available medium accessible by a computer, and examples thereof may include all volatile and non-volatile media and separable and non-separable media. Examples of the computer-readable medium may include, but are not limited to, magnetic storage media (e.g., read-only memories (ROMs), floppy disks, and hard disks) and optical recording media (e.g., compact disk (CD)-ROMs and digital versatile disks (DVDs)). Further, examples of the computer-readable medium may include computer storage media and communication media.

Also, a plurality of computer-readable recording media may be distributed over network-coupled computer systems, and data stored in the distributed recording media, for example, program instructions and code, may be executed by at least one computer.

While embodiments of the disclosure have been particularly shown and described with reference to the attached drawings, it will be understood by one of ordinary skill in the art that various changes in form and details may be made therein without departing from the spirit and scope of the disclosure as defined by the appended claims. Hence, the embodiments of the disclosure should be considered in descriptive sense only and not for purposes of limitation.

The invention claimed is:

1. An operating method of a target device, the operating method comprising:
   generating a random value based on whether an electronic device is within a certain distance from the target device;
   transmitting, to the electronic device, first information comprising the generated random value and identification information of the target device;
   receiving, from the electronic device, first authentication information obtained based on the first information;
   encrypting the received first authentication information by using a target device key;
   encrypting the target device key by using a server key;
   transmitting, to the electronic device for a server authentication, the encrypted target device key and the encrypted first authentication information;
   receiving, from the electronic device, second authentication information obtained based on the server authentication; and
   determining whether to open or close a door based on a comparison between the second authentication information and the random value,
   wherein the first information is signed with a private key of the electronic device, wherein the first authentication information includes the signed first information and identification information of the electronic device.

2. The operating method of claim 1, wherein the second authentication information comprises a value corresponding to the random value in the first authentication information.

3. The operating method of claim 1, wherein the determining comprises:
decrypting the second authentication information by using the target device key;
when the decrypted second authentication information comprises a value corresponding to the random value, determining to open the door; and
when the decrypted second authentication information does not comprise the value corresponding to the random value, determining to close the door.

4. An operating method of an electronic device, the operating method comprising:
receiving, from a target device, first information comprising identification information of the target device and a random value;
signing the received first information with a private key of the electronic device;
transmitting, to the target device, first authentication information comprising the signed first information and identification information of the electronic device;
transmitting, to a server, an encrypted target device key and encrypted first authentication information received from the target device;
receiving, from the server, second authentication information obtained based on the first authentication information; and
transmitting the received second authentication information to the target device,
wherein the encrypted first authentication information is encrypted by using the target device key, and
wherein the encrypted target device key is encrypted by using a server key.

5. The operating method of claim 4, further comprising:
receiving server information from the target device,
wherein the transmitting to the server comprises transmitting, to the server, a public key of the electronic device for authenticating information about the electronic device,
the target device key received from the target device, and the first authentication information, based on the received server information.

6. A target device comprising:
a transceiver;
a memory configured to store at least one instruction; and
at least one processor configured to control the target device by executing the at least one instruction to:
generate a random value based on whether an electronic device is within a certain distance from the target device,
transmit, to the electronic device, first information comprising the generated random value and identification information of the target device,
receive, from the electronic device, first authentication information obtained based on the first information,
encrypt the received first authentication information by using a target device key,
encrypt the target device key by using a server key,
transmit, to the electronic device for a server authentication, the encrypted target device key and the encrypted first authentication information,
receive, from the electronic device, second authentication information obtained based on the server authentication, and
determine whether to open or close a door based on a comparison between the second authentication information and the random value,
wherein the first information is signed with a private key of the electronic device,
wherein the first authentication information includes the signed first information and identification information of the electronic device.

7. The target device of claim 6, wherein the second authentication information comprises a value corresponding to the random value in the first authentication information.

8. The target device of claim 6, wherein the at least one processor is further configured to:
decrypt the second authentication information by using the target device key;
when the decrypted second authentication information comprises a value corresponding to the random value, determine to open a door; and
when the decrypted second authentication information does not comprise the value corresponding to the random value, determine to close the door.

9. An electronic device comprising:
a transceiver;
a memory configured to store at least one instruction; and
at least one processor configured to control the electronic device by executing the at least one instruction to:
receive, from a target device, first information comprising identification information of the target device and a random value,
sign the received first information with a private key of the electronic device,
transmit, to the target device, first authentication information comprising the signed first information and identification information of the electronic device,
transmit, to a server, an encrypted target device key and encrypted first authentication information received from the target device,
receive, from the server, second authentication information obtained based on the first authentication information, and
transmit the received second authentication information to the target device,
wherein the encrypted first authentication information is encrypted by using the target device key, and
wherein the encrypted target device key is encrypted by using a server key.

10. The electronic device of claim 9, wherein the at least one processor is further configured to:
receive server information from the target device; and
transmit, to the server, a public key of the electronic device for authenticating information about the electronic device, the target device key received from the target device, and the first authentication information, based on the received server information.

* * * * *